March 8, 1960 H. C. LAFFERTY ET AL 2,927,562
ENGINE FUEL CONTROL MEANS
Filed Oct. 3, 1957 4 Sheets-Sheet 2

INVENTORS
Hugh C. Lafferty &
Ottar Juxen
BY S. C. Thorpe
ATTORNEY 2,927,562

ENGINE FUEL CONTROL MEANS

Hugh C. Lafferty, La Grange, Ill., and Ottar Tuxen, Sola per Stavanger, Norway, assignors to General Motors Corporation, Detroit, Mich., a corporation of Delaware Application October 3, 1957, Serial No. 700,927

(Filed under Rule 47(b) and 35 U.S.C. 118)

4 Claims. (Cl. 123—27)

This invention relates to an internal combustion engine having two separate sources of fuel supply and particularly to improvements in control mechanisms for such engines which are sensitive to the pressures of one of the sources and changes thereof to operate the engine alternatively primarily from one source or the other.

A complete description of the type of engine to which this invention relates, including its general operating characteristics and advantages, may be found in U.S. patent application Serial Number 625,699, filed December 3, 1956.

It is a primary purpose of this invention to improve the mounting and arrangement of the control linkage for shifting from one source to the other and which operates the fuel valves between the separate fuel sources and the engine.

Another purpose of the invention is to provide in the linkage means which changes the sensitivity of response of the linkage to pressures of one of the fuel sources thereby to momentarily delay return of the engine to operation on fuel primarily from that source until the engine undergoes certain adjustments as a result of shifting from one source to the other.

For a further understanding of the invention and the objects thereof, reference may be made to the accompanying detailed description and drawings in which.

Figure 4:
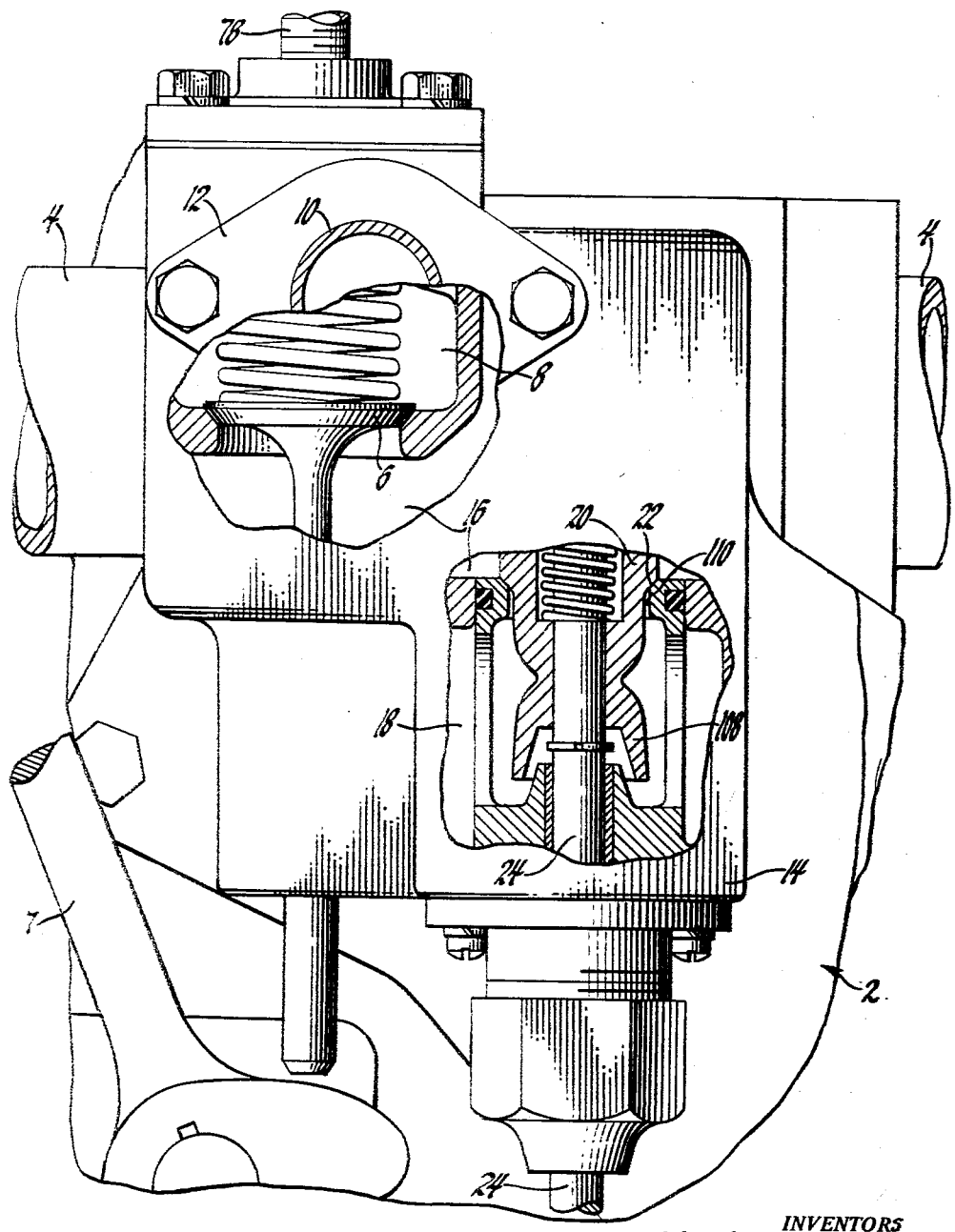
Fig. 4 is an enlarged view of another portion of Fig. 1 with parts in section and broken away particularly illustrating the details of the gaseous fuel valve.

Referring now to the drawings, a part of an internal combustion engine is shown and identified generally by the numeral 2. The engine 2 includes oppositely extending intake gas manifolds 4 which are adapted to distribute gaseous fuel to the cylinders of the engine which for purposes of simplicity, have been broken away. The engine 2 is provided with a gaseous fuel shutoff valve 6 (see Fig. 4) which is located in a valve chamber 8. The shutoff valve is operable to an open position by cam lever 7 pivotally mounted on the engine. A gaseous fuel supply source is connected to chamber 8 by means of a conduit 10 which is secured by a coupling flange 12 to a mating flange formed integrally of valve casing 14 which houses valve 6 and defines the valve chamber 8. When the fuel shutoff valve 6 has been opened by the cam lever 7 either manually or by other suitable means, the gaseous fuel supplied to the chamber 8 may flow past the valve seat thereof into the chamber 16. Between chamber 16 and distributing chamber 18 which is in communication with the manifolds 4 there is provided a gaseous fuel supply throttle valve 20. When valve 20 is raised off its seat 22 by its operating rod 24 and the fuel control linkage, to be described in detail herein shortly, fuel may flow from chamber 16 past seat 22 into the chamber 18 and thence via the manifolds 4 which are in communication with chamber 18 to the cylinders of the engine for combustion therein.

In addition to the gaseous fuel source of supply provided for the engine 2, there is also provided in the present instance a suitable supply of diesel fuel oil which is metered to the individual cylinders of the engine in a conventional manner by operating means 26 and 28 which extend to the racks of diesel fuel oil injectors located in the engine cylinder heads above oppositely disposed banks of the engine cylinders, which again have been broken away for purposes of simplicity.

In conjunction with the foregoing, it will be appreciated from the description to follow that the control linkage which forms the subject of the present invention is particularly adapted for use in correlating the regulation and supply of fuel from the separate fuel sources provided for the engine. This control means includes an engine governor 30 having an output shaft 32 to which an arm 34 is fixed for rotation therewith outside of the governor housing. The end 36 of arm 34 which tends to rotate or oscillate about the axis of the shaft 32 has pivotally connected thereto one end 38 of a link 40 also located outside the housing of the governor 30. The opposite end 42 of link 40 is pivotally connected to end 44 of an arm 46 having its opposite end 48 fixed to rotate with a shaft 50.

Figure 2:
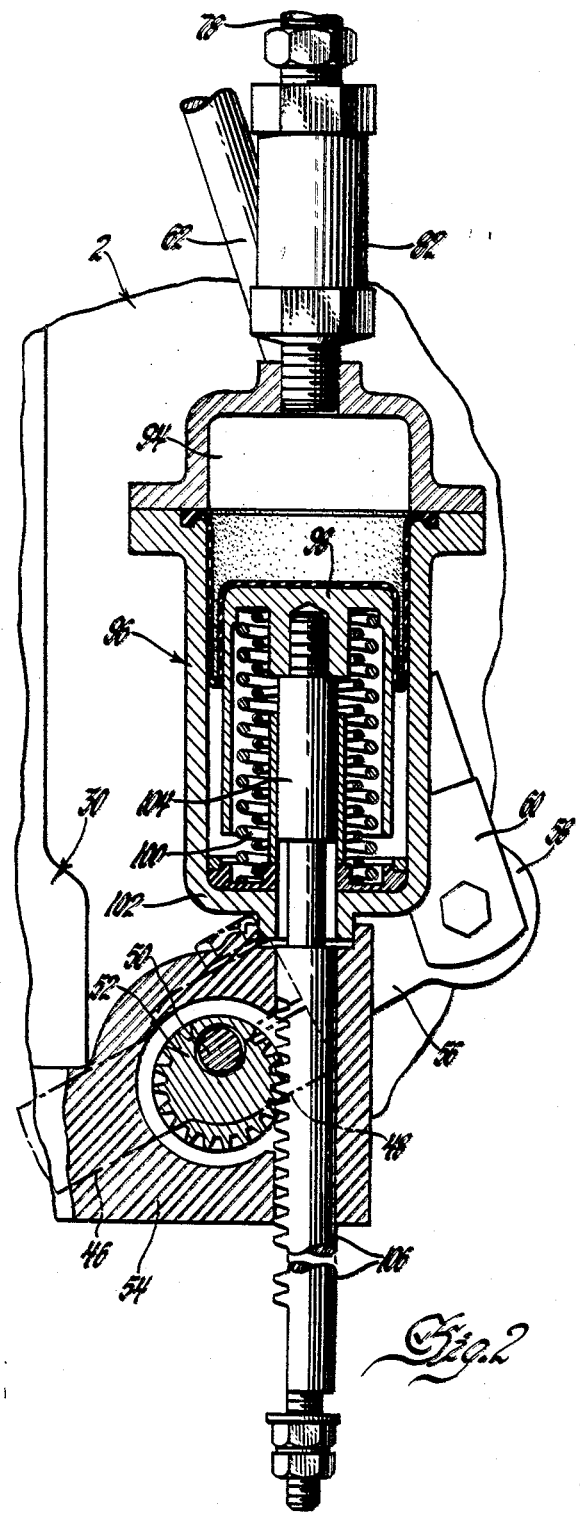
Fig. 2 is an enlarged view of a portion of Fig. 1 showing the control means with parts broken away and in section to particularly illustrate the details thereof.
Figure 5:
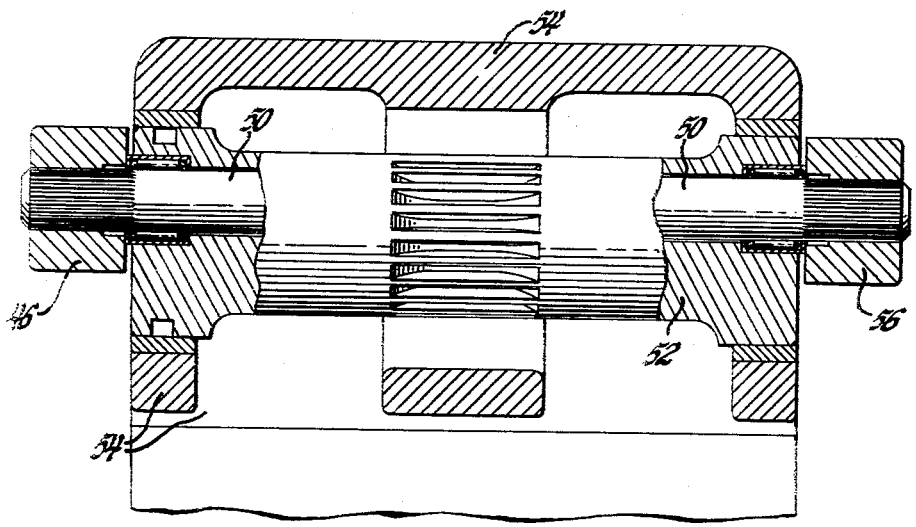
Fig. 5 is a fragmentary sectional view taken substantially in the plane of the line 5—5 in Fig. 1 and illustrates certain details of the fuel control linkage.
Figure 6:
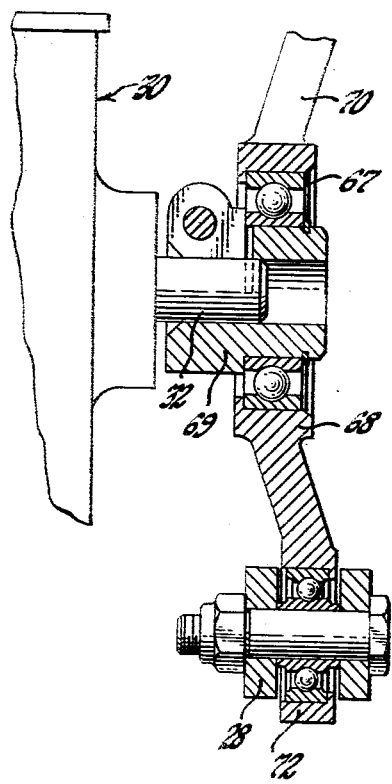
Fig. 6 is a view taken substantially in the plane of the line 6—6 in Fig. 1 and illustrates certain additional details of the fuel control linkage.

Referring now particularly to Figs. 2 and 5, it will be observed that shaft 50 extends through, is journaled for rotation in, and is eccentrically moved by a pinion 52, which is journaled for rotation in a support 54 fixed to the governor housing 30. The shaft 50 also has fixed thereto so as to rotate therewith one end of a lever 56 located on the opposite side of the support 54 from the arm 46. An end 58 of arm 56 has pivotally connected thereto an end 60 of a link 62 whose opposite end 64 is pivotally connected to one arm 66 of a bell crank 68. The bell crank 68, as best seen in Fig. 6, is journaled by a bearing 67 on a hub 69 which is secured to the end of the output shaft 32 which projects outside the governor housing on the side opposite the output lever arm 34. In addition to the arm 66, the bell crank 68 is also provided with arms 70 and 72 which are connected to the ends of the fuel injector operating means 26 and 28. Also provided as a part of the crank 68 is a fourth arm 74 which by means of a link 76 is connected to the operating rod 24 of the gaseous fuel valve 20.

Figure 1:
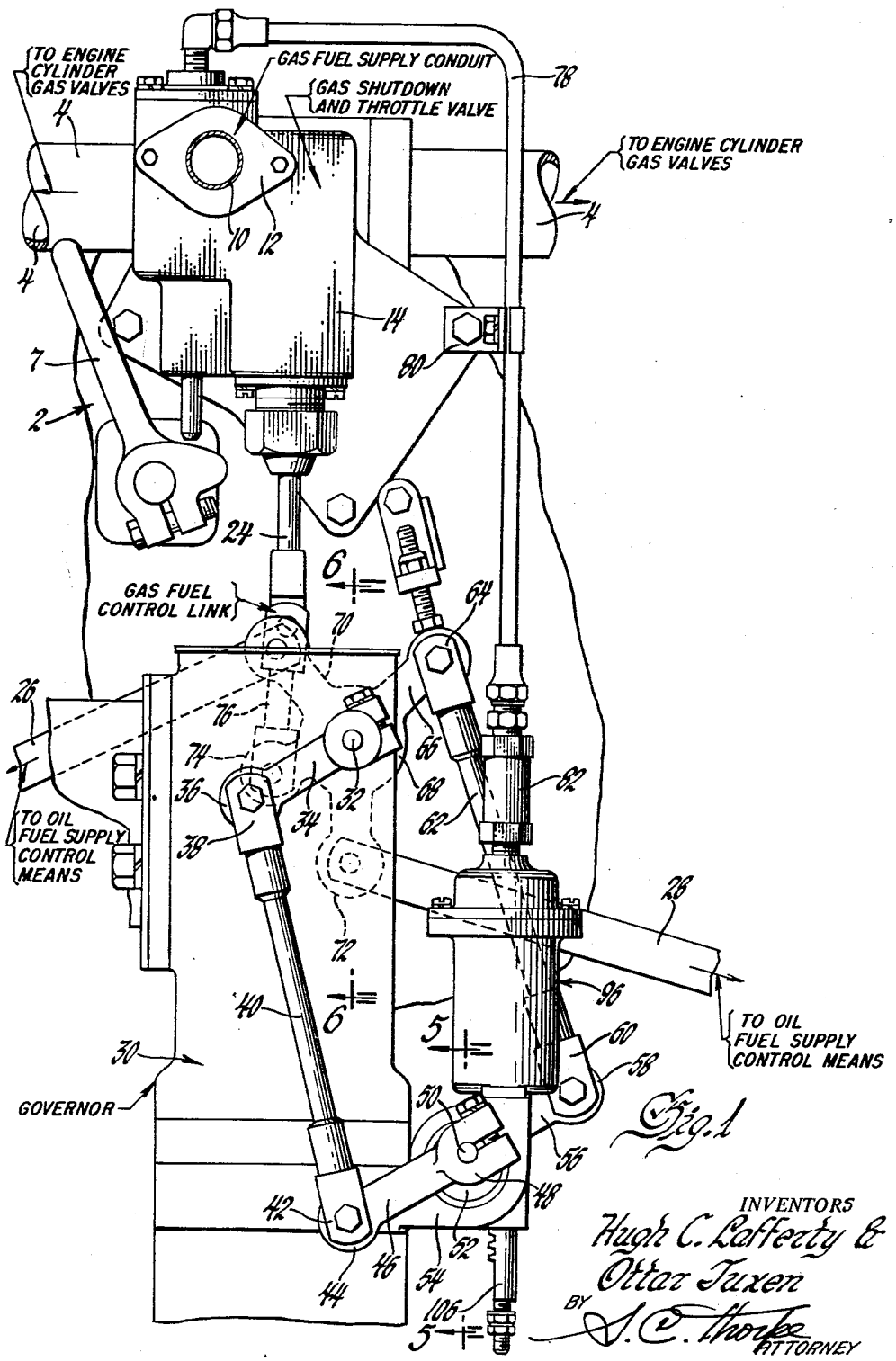
Fig. 1 is a view in elevation of the relevant portions of an internal combustion engine with parts broken away and in section which particularly shows the control means superimposed thereon.
Figure 3:
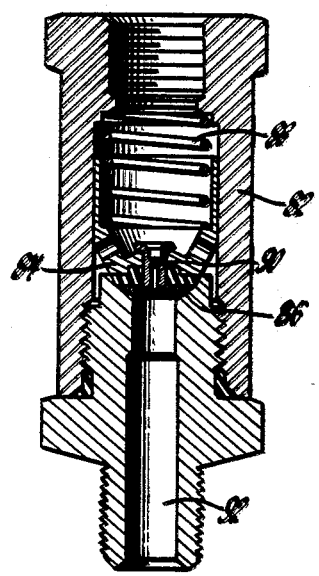
Fig. 3 is a detailed showing with parts in section of a unique flow control type check valve used to retard the transfer of operation of the engine from one fuel to the other.

Referring now particularly to Figures 1 and 2, it will be observed that a conduit 78 is suitably fastened to the valve casing 14, which communicates with the chamber 8. Conduit 78 is supported by a suitable bracket 80 fixed to engine 2. The pipe or conduit 78 leads to the upper end of a valve housing 82 (refer for a moment to Fig. 3). Located in the housing 82 is a spring biased flow control, one-way metering check valve 84 (whose purpose shall appear shortly). The valve member 84 is normally maintained on its seat 86 by the gas pressure applied thereto and a suitable valve spring 88. The valve 84, however, is provided with a relatively small passage 90 which maintains constant communication between the conduit 78 and a passageway 92 leading to an expansible chamber 94 in one end of a piston and cylinder assembly indicated generally by a numeral 96.

The piston and cylinder assembly 96, in addition to the expansible chamber 94, includes a piston 98 which is normally biased to reduce the size of chamber 94 by means of a nested helical coil spring set 100, extending between the piston and an end 102 of the assembly 96. The piston 98 has secured thereto and extending axially through the assembly 96 an operating rod or stem 104 which is provided, on its end opposite the end fixed to the piston 98, with a rack 106. The rack 106 is in meshing engagement with the pinion 52 so that when the expansible chamber 94 is filled with sufficient pressure from the gaseous fuel source for gaseous fuel operation of the engine with only pilot oil injection for initiating combustion within the several engine cylinders, the rack is caused to move downwardly to its position shown in Fig. 2 of the drawings. This downward movement of the rack 106 causes the pinion to rotate carrying the axis of the shaft 50 upwardly to the position shown. This changes the location of the pivot point of the levers or arms 46 and 56 with respect to the operating shaft 32 of the governor and thereby the operating characteristics of the fuel control linkage. It should again be emphasized at this point that the arm 34 is fixed so that it rotates with the governor output shaft 32. The crank 68, however, is not fixed to shaft 32 but is journaled for rotation thereon.

Now, let it be assumed for a moment that the fuel shutoff valve 6 is open and that the engine is operating on gaseous fuel. Under such conditions, pressure from the gaseous fuel source will be supplied through the flange 10, chamber 8, conduit 78, through valve housing 82 and passageway 92 to the expansible chamber 94 of a piston and cylinder assembly 96. Assuming that the pressure of the gaseous fuel pressure source is at or above a predetermined pressure sufficient to maintain piston 98 downwardly in the position shown in Fig. 2, thereby retaining shaft 50 in its uppermost position, this will so arrange the various arms and links of the fuel control linkage as to cause the arm 74 via its connection 76 to the operating rod 24 to hold the fuel supply valve 20 open thereby allowing gaseous fuel to enter into the intake manifolds 4. If now the governor should call for a greater output, its output shaft 32 will rotate clockwise causing the arm 34 to also rotate clockwise, link 40 to move upwardly, lever arms 46 and 56 to rotate clockwise, arm 62 to move downwardly and the bell crank 66 to move clockwise all as viewed in Fig. 1. Movement of the crank 68 clockwise will also cause the operating rod 24 of supply valve 20 to move further upwardly thereby allowing additional fuel to be supplied to the cylinders of the engine via the intake manifolds 4 by reason of the configuration of the valve 20.

However, if, for any reason, there should be insufficient fuel from the gaseous fuel source and the pressure should drop below a predetermined minimum necessary to operate the engine on gaseous fuel, this loss of pressure will, via the conduit 78, be felt in the expansible chamber 94 thereby enabling the spring set 100 to move piston 98, the rack 106, pinion 52, and shaft 50 to positions opposite to those shown in Figures 1 and 2. The result of such movement is to rotate the bell crank 68 in a further direction clockwise which will cause the lower skirt portion 108 of gaseous fuel supply valve 20 to effect a close clearance seal with the cylindrical portion 110 immediately below valve seat 22 thereby cutting off the gaseous fuel supply to the engine. At the same time, the operating means 26 and 28 will be moved by rotation of the arms 70 and 72 further in a clockwise direction to increase the amount of diesel fuel so that the engine now operates only on diesel fuel.

The flow control check valve 84, by proper selection of the characteristic of its spring 88, will allow practically immediate exhaustion of the expansible chamber 94 upon failure of the gaseous fuel supply so that the transition from gaseous to diesel fuel takes place quite rapidly. Now, if the gaseous fuel pressure should return, the gaseous fuel pressure will be again supplied to the chamber 94; however, it now has to pass through the metering or passage 90 in order to delay the return to operation of the engine primarily on gaseous fuel. As gaseous fuel is metered through the passageway 90 and the pressure builds up sufficiently in chamber 94, the piston 98 will again move downwardly as viewed in Fig. 2 causing the shaft 50 to again move to its upper position thereby rotating the crank 68 counterclockwise. Rotation of crank 68 counterclockwise as determined by the movement of shaft 50 from its lower to its upper position causes gaseous fuel valve 20 to move downwardly again allowing gaseous fuel to flow to the intake manifolds 4 leading to the engine cylinders. Such rotation also moves the operating means 26 and 28 to reduce the supply of diesel fuel to the cylinders to the pilot amount normally used to ignite the gaseous fuel mixture.

The unusual arrangement of the engine fuel control linkage and the manner of making it responsive to pressure changes of one of the sources of fuel supply has several advantages. First of all by utilizing the unique pinion and rack assembly arrangement to move the linkage a considerable amount of mechanical advantage is obtained. This allows a much smaller piston and cylinder assembly to be used while assuring that there will be sufficient force to move the gaseous supply valve 20 and the operating means 26 and 28 for the fuel injector racks in the desired manner. Secondly, the piston and cylinder assembly may be mounted securely on the engine or support instead of as a floating link as has formerly been done. This also allows the conduit 78 to be made of rigid tubing which can also be securely mounted without any flexing.

It will be recalled that located between piston and cylinder assembly 96 as the gaseous fuel source is the flow control, one-way metering check valve assembly of the housing 82. The purpose of this flow control valve assembly is this: When changing from gaseous fuel to diesel oil fuel due to loss of pressure of the gaseous fuel the transfer should occur rapidly to avoid any starving of the engine. The flow control check valve allows this to occur by quickly opening on reduction of gaseous fuel pressure to relieve the pressure in piston and cylinder assembly 96. On the other hand when going from diesel fuel to gaseous fuel on a return of gaseous fuel pressure it is desirable that the transfer take place much more gradually hence the presence of check valve 84 and the metering passage 90. The passage 90 allows the expansible chamber 94 to increase gradually thus gradually opening the gaseous fuel throttle or supply valve 20 while at the same time gradually reducing the diesel fuel oil supply through the operating means 26 and 28. This gradual transition prevents any overcharging of the engine cylinders. It also enables any exhaust gases in the intake manifolds to be purged prior to cut-off of the diesel fuel to avoid the possiblity of starving of the engine during the transition from diesel fuel to gaseous fuel.

We claim:

1. In combination with an engine having two fuel sources, means responsive to pressures of one of said sources above a predetermined pressure to supply fuel to said engine primarily from the one of said sources and below said predetermined pressure primarily from the other of said sources comprising a first operating means adapted to control fuel supply between the one of said sources and said engine, a second operating means adapted to control fuel supply between the other of said sources and said engine, a support, a lever operatively pivoted to said support and operatively connected to said operating means, and a spring-loaded piston and cylinder assembly connected between said lever and support sensitive to pressures of the one of said sources above said predetermined pressure to move said lever about its pivot in one direction and accordingly said first operating means in a fuel supply decreasing direction and said second operating means in a fuel supply increasing direction and below said predetermined pressure to move said lever about its pivot in an opposite direction and accordingly said first operating means in a fuel supply increasing direction and said second operating means in a fuel supply decreasing direction.

2. In combination with an engine having two fuel sources, means responsive to pressures of one of said sources above a predetermined pressure to supply fuel to said engine primarily from the one of said sources and below said predetermined pressure primarily from the other of said sources comprising a first operating means adapted to control fuel supply between the one of said sources and said engine, a second operating means adapted to control fuel supply between the other of said sources and said engine, a linkage connected to said operating means including a spring-loaded piston and cylinder assembly sensitive to the pressures of the one of said sources above said predetermined pressure to move said first operating means in a fuel supply decreasing direction and said second operating means in a fuel increasing direction and below said predetermined pressure to move said first operating means in a fuel supply increasing direction and said second operating means in a fuel supply decreasing direction, and an orificed one-way metering check valve between the one of said sources and said cylinder assembly metering the pressure into said assembly and allowing rapid escape of the pressure therefrom.

3. In combination with an engine having two fuel sources, a first operating means adapted to control fuel supply between one of said sources and said engine, a second operating means adapted to control fuel supply between the other of said sources and said engine, a support, a lever operatively pivoted to said support and operatively connected to said operating means, and a spring-loaded piston and cylinder assembly fixed to said support, a pinion journaled for rotation on said support, said pinion being pivotally connected to said lever eccentric to the pivotal axis thereof, said piston cylinder assembly including an operating rack in meshing engagement with said pinion, said piston and cylinder assembly being sensitive to pressures of the one of said sources above a predetermined pressure to move said lever about its pivot on said support in one direction and accordingly said first operating means in a fuel supply decreasing direction and said second operating means in a fuel supply increasing direction and further sensitive to pressures of the one of said sources below said predetermined pressure to move said lever about its pivot in an opposite direction and accordingly said first operating means in a fuel supply increasing direction and said second operating means in a fuel supply decreasing direction.

4. In combination with an engine having two fuel sources, means responsive to pressures of one of said sources above a predetermined pressure to supply fuel to said engine primarily from the one of said sources and below said predetermined pressure primarily from the other of said sources comprising a first operating means adapted to control fuel supply between the one of said sources and said engine, a second operating means adapted to control fuel supply between the other of said sources and said engine, a support, a lever operatively pivoted to said support and operatively connected to said operating means, and a spring-loaded piston and cylinder assembly connected between said lever and support and sensitive to pressures of the one of said sources above said predetermined pressure to move said lever about its pivot in one direction and accordingly said first operating means in a fuel supply decreasing direction and said second operating means in a fuel supply increasing direction and below said predetermined pressure to move said lever about its pivot in an opposite direction and accordingly said first operating means in a fuel supply increasing direction and said second operating means in a fuel supply decreasing direction, and an orificed one-way metering check valve between the one of said sources and said cylinder assembly metering the pressure into said assembly and allowing rapid escape of the pressure therefrom.

References Cited in the file of this patent

UNITED STATES PATENTS

| | | |
|---|---|---|
| 2,612,145 | Steven et al. | Sept. 30, 1952 |
| 2,794,430 | Moulton | June 4, 1957 |